US 6,736,776 B2

(12) United States Patent
Miles (10) Patent No.: US 6,736,776 B2
(45) Date of Patent: May 18, 2004

(54) METHOD FOR DIAGNOSING AND INTERPRETING DENTAL CONDITIONS

(75) Inventor: Dale A. Miles, Lexington, KY (US)

(73) Assignee: Interactive Diagnostic Imaging, LLC, Marietta, GA (US)

( * ) Notice: Subject to any disclaimer, the term of this patent is extended or adjusted under 35 U.S.C. 154(b) by 49 days.

(21) Appl. No.: 10/269,407

(22) Filed: Oct. 11, 2002

(65) Prior Publication Data

US 2004/0073092 A1 Apr. 15, 2004

(51) Int. Cl.[7] ................................................ A61B 5/00
(52) U.S. Cl. ...................... 600/300; 128/920; 382/132
(58) Field of Search ............................... 600/300–301, 600/407; 129/920, 922, 925; 382/128, 132; 705/2–4

(56) References Cited

U.S. PATENT DOCUMENTS

| | | | |
|---|---|---|---|
| 5,463,548 A | | 10/1995 | Asada et al. |
| 5,740,267 A | * | 4/1998 | Echerer et al. ............. 382/132 |
| 6,297,044 B1 | * | 10/2001 | Eisen et al. .............. 435/287.1 |
| 6,324,516 B1 | * | 11/2001 | Shults et al. ................... 705/2 |
| 6,459,920 B1 | * | 10/2002 | Hines et al. ................ 600/407 |
| 6,524,241 B2 | * | 2/2003 | Iliff ............................. 600/300 |

* cited by examiner

Primary Examiner—Charles Marmor
Assistant Examiner—Michael Astorino
(74) Attorney, Agent, or Firm—Woodard, Emhardt, Moriarty, McNett & Henry LLP (57) ABSTRACT

A method for diagnosing and interpreting dental conditions using a computer system is disclosed. An image of the lesion being diagnosed is captured and terms describing the lesion are selected. A differential diagnosis list of the most probable lesions is returned. The user views details about each listed lesion until a match is selected, and appropriate medications for the selected lesion are presented. Medication details are reviewed and a proper medication to prescribe is selected. The user can generate a prescription, treatment algorithm, directions report, or a medication report. If the user is uncomfortable with the diagnosis, a referral report can be generated. For performing routine interpretation of dental conditions, the user captures an image for digital x-ray analysis. The user selects the task, such as caries detection, for which to optimize the image. The system optimizes the image based on the task selected and displays the optimized image.

25 Claims, 12 Drawing Sheets

Referral Report

126

Mrs. I Hurt is referred to your office for the evaluation and management of her oral ulcers.

124

As you can see from the above image, there are several small ulcerations with red borders and gray pseudomembranes present on unattached oral mucosal surfaces. They are constantly painful, and not relieved by analgesics.

These lesions come and go periodically, but always return and are always painful.

Please copy your report of findings and proposed treatment for my records.

Thanks in advance for seeing this patient

Sincerely,

Dr. J. Doe
1234 Professional Lane
Marietta, GA 30066
770-591-0000

METHOD FOR DIAGNOSING AND INTERPRETING DENTAL CONDITIONS

TECHNICAL FIELD OF THE INVENTION

The invention generally relates to computer software and more specifically to a method for diagnosing and interpreting dental conditions and generating patient medication instructions, specialist referral letters, and prescription forms as well as a clinical and/or radiographic image for printing.

BACKGROUND OF THE INVENTION

Currently, dentists have a hard time diagnosing oral lesions and follow a tedious and unproductive process. A dentist first has to write a complete and accurate description of the oral lesion. Once he has a description, he then has to look through old textbooks or dental atlases to match a picture. Once the dentist locates a match in one of the books, he then has to look up the appropriate medication for treating the lesion. The books and sources the dentist consults in this process may not contain the most current information available. Often, even if the dentist is able to make a diagnosis, he is uncomfortable using medical treatment such as steroids. More often than not, the dentist ends up referring the patient out of the office to a specialist because he is not able to make a diagnosis or because he is not comfortable using certain medical treatment. If the dentist is comfortable making the diagnosis, he then has to manage the case treatment plan, maintain the patient records, and in this process often generates varying documents, such as a prescription and patient directions, to name a few.

Furthermore, dentists spend a lot of unproductive time analyzing x-rays in performing routine radiographic interpretation of conditions such as caries (dental cavities) detection, periodontal bone evaluation, or periapical bone assessment, to name a few.

The problems with the present processes have created a need for a simpler and less time-consuming means of diagnosing oral lesions and interpreting routine dental conditions as well as improving the dentist's productivity by quickly producing documents for the case management. The present invention is directed toward meeting this need.

SUMMARY OF THE INVENTION

It is an object of the present invention to provide an improved method for diagnosing and interpreting dental conditions and improving the management of these conditions. It is a further object of the present invention to provide an improved method for helping the dentist use the most current, evidence-based treatment for the condition, thereby improving patient care.

These objects and others are achieved by various forms of the present invention. According to one aspect of the invention, a method for diagnosing oral lesions using a computer system is disclosed. An image of the oral lesion to be diagnosed is captured, and the user selects one or more descriptor terms to describe the lesion. The system processes the selection and returns a differential diagnosis list that includes the most probable lesions that should be considered. The user can then view details about each of the lesions in the differential diagnosis list, such as the signs, symptoms, and behavior of the selected lesion to determine which lesion in the list is the best match with the lesion being diagnosed. If the user is not able to find a satisfactory match, the user can either refine the descriptor terms to potentially receive a new differential diagnosis list, or in the alternative, generate a referral report to send the patient out of the office.

If the user is comfortable that a proper match has been found, the selection can be finalized and a list of appropriate medications for treating the lesion is then presented. Further medication details, such as a description, indications, adverse reactions, and side effects can be reviewed until the user is comfortable with choosing a final medication to prescribe to the patient. If the user is not comfortable with any of the medication options, a referral report can be generated to send the patient out of the office. Once the proper medication has been selected, the user can generate a patient prescription that can be printed and given to the patient for filling by a pharmacy. The user can also generate a number of reports and documents, such as a patient directions report or a medication report, and an accompanying clinical photograph or radiographic photograph. The system provides the user with a customized treatment algorithm to provide guidance on treating the lesion. The user can additionally save the selected lesion, selected medication, finalized prescription, and acquired image to the patient's record electronically.

According to another aspect of the invention, a method for interpreting dental conditions using a computer system is disclosed. The user can capture a radiographic digital image of the condition on the system for digital x-ray analysis. The user can optionally also capture a clinical image of the condition. Then, the user can select to have an image optimized by an image processing algorithm for various tasks, such as caries (dental cavity) detection, peridontal bone evaluation, or periapical bone assessment. The system optimizes the image based on the task selected and displays the optimized image to the user for further analysis and interpretation.

In yet another aspect of the invention, a method for diagnosing oral lesions comprises the steps of: (a) acquiring an image of an oral lesion being diagnosed for a patient; (b) outputting to a visual display a plurality of descriptor terms for describing a plurality of oral lesions; (c) selecting a subset of the plurality of descriptor terms to describe the oral lesion being diagnosed; (d) processing the selected subset of the plurality of descriptor terms to output to the visual display a differential diagnosis list of the most probable oral lesions; (e) finally selecting a most appropriate oral lesion from the differential diagnosis list; (f) processing the finally selected oral lesion to output to the visual display a list of appropriate medications for treating the finally selected oral lesion; and (g) finally selecting a most appropriate medication from the list of appropriate medications.

A further aspect of the invention includes a method for diagnosing oral lesions, comprises the steps of: (a) storing in a computer system details about each of a plurality of oral lesions, said details comprising: signs, symptoms, treatment medications, and descriptor terms; (b) acquiring an image of an oral lesion being diagnosed; (c) retrieving from the computer system a unique list of descriptor terms associated with the plurality of oral lesions; (d) receiving in the computer system user input operative to select a subset of the unique list of descriptor terms to describe the oral lesion being diagnosed; and (e) using the computer system to compare the selected subset of the unique list of descriptor terms with the descriptor terms stored for each of the plurality of oral lesions to output a differential diagnosis list of the most probable oral lesions.

According to yet another aspect of the current invention, a method for interpreting dental conditions is disclosed, comprising the steps of: (a) acquiring to a computer system a digital image of a dental condition to be interpreted; (b) selecting a task option to have the image interpreted for a specific task; (c) optimizing the image for the selected task option; and (d) displaying the optimized image.

Yet a further aspect of the current invention includes a method for interpreting dental conditions, comprising the steps of: (a) storing in a computer system an algorithm for optimizing digital images for a plurality of dental tasks; (b) acquiring to the computer system a digital image of a dental condition to be interpreted; (c) outputting a list of the plurality of dental tasks; (d) receiving in the computer system user input operative to select a dental task from the list; (e) using the algorithm stored in the computer system to optimize the acquired digital image for the selected dental task; and (f) outputting the optimized image for analysis and diagnosis by the dentist.

DETAILED DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The present invention provides a method and software program for diagnosing and interpreting dental conditions. Dentists and dental hygienists can use the method and software program for assisting with their clinical diagnosis of common oral lesions and problems unrelated to caries (dental cavities) and periodontal disease. Those having ordinary skill in the art will recognize that the software program and method described herein can be used to diagnose a variety of oral lesions, such as burning mouth/tongue syndrome, candidiasis, cheilitis, cicatricial pemphigoid (benign mucous membrane pemphigoid), oral lichen planus, herpes simplex virus, recurrent aphthous stomatitis/ recurrent aphthous ulcers, xerostomia, and other lesions.

For routine x-ray interpretation, dentists and dental hygienists can use the method and software program of the present invention to optimize the image for the specific task and use it as a digital x-ray system. Those having ordinary skill in the art will recognize that the software program and method for digital x-ray analysis described herein can be used to optimize images for a variety of tasks, such as for caries (dental cavities) detection, periodontal bone evaluation, periapical bone assessment, and other common diagnostic tasks.

In a preferred embodiment, the software program and method is used to assist the dentist or dental hygienist with diagnosing oral lesions.

Figure 1A:
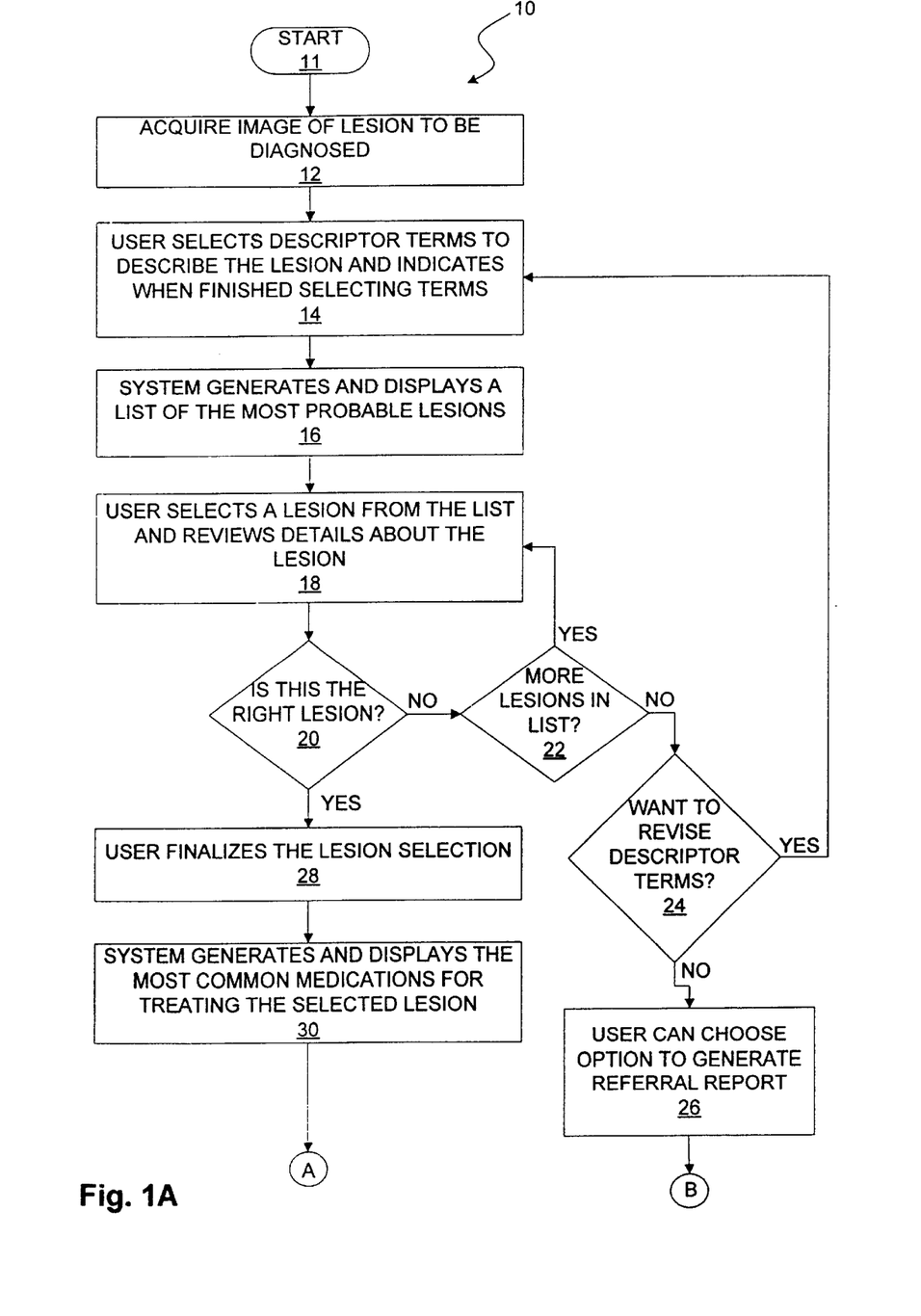
FIG. 1A is a schematic diagram of a first half of a preferred embodiment method of diagnosing oral lesions of the present invention, demonstrating the steps and processes involved in identifying the proper lesion.
Figure 1B:
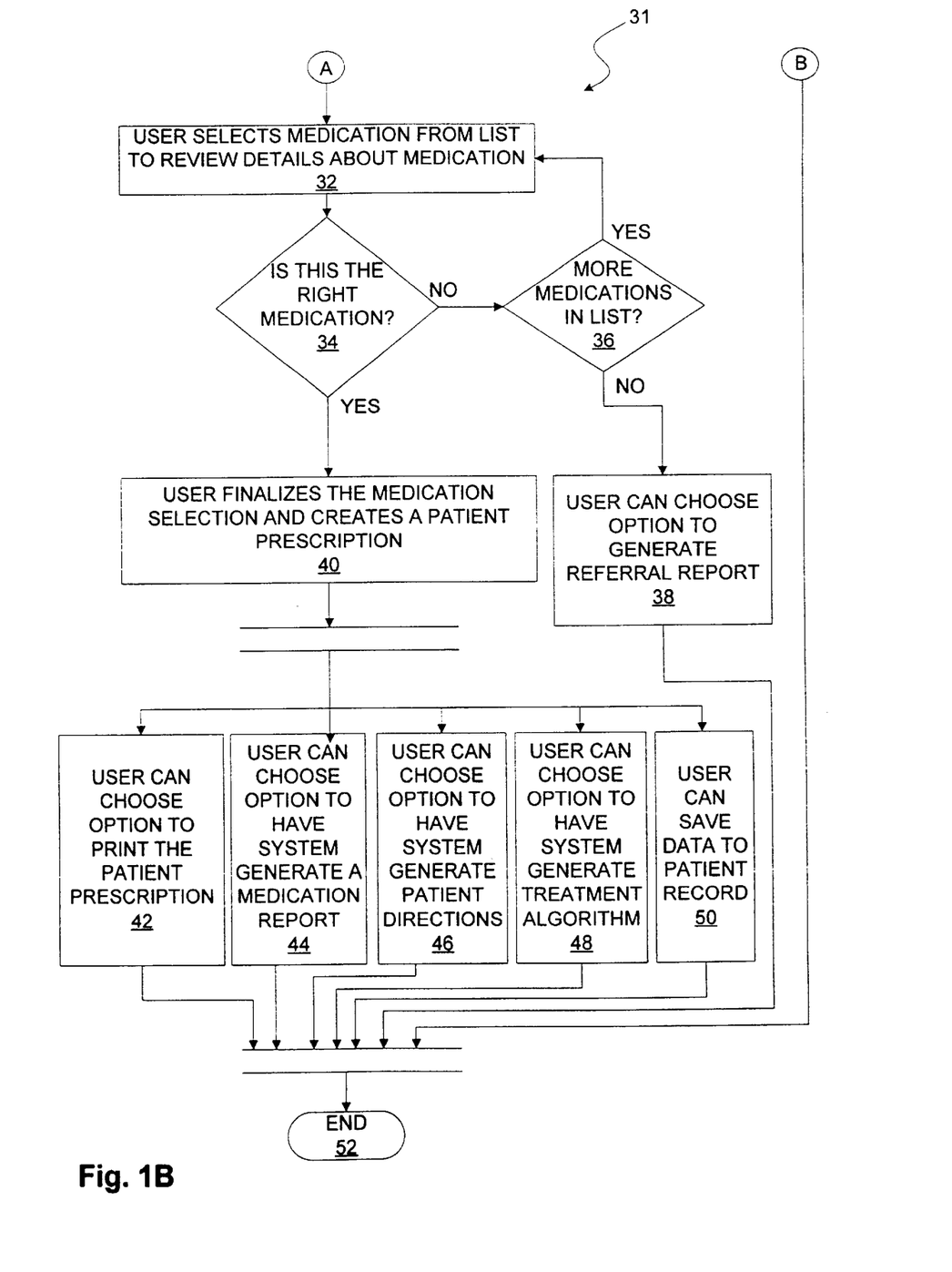
FIG. 1B is a schematic diagram of a second half of a preferred embodiment method of diagnosing oral lesions, demonstrating the steps and processes involved in selecting the proper medication for treating the lesion as well as generating various reports and outputs.

As shown in FIG. 1A, the first part 10 of the preferred embodiment process involves identifying the proper oral lesion. The second part 31 of the preferred embodiment process, as shown in FIG. 1B, involves identifying the proper medication for treating the lesion and generating a variety of optional reports. Each part of the process will now be described with greater detail and with reference to the figures.

First, the lesion identification part of the process shown in FIG. 1A will be discussed. The process starts at 11 and the image of the oral lesion that needs to be diagnosed is acquired 12. The image may be captured with a digital camera, digital video camera, or instant-camera, as a few non-limiting examples. The captured image may also then optionally be uploaded or scanned into a computer. Then, the user selects descriptor terms to describe the lesion being diagnosed and selects an option to indicate when finished selecting terms 14. Upon selection of this option, the system processes the descriptor terms to find the lesions with the closest match and then displays 16 a differential diagnosis list of the most probable lesions that the system determines should be included in the diagnosis. The user has the option to select and view 18 details about any of the lesions in the differential diagnosis list, such as the signs, symptoms, and behavior of the lesion.

If the user determines the current selected lesion is not a good match with the lesion to be diagnosed 20 and there are more lesions in the differential diagnosis list 22, the user can select another lesion from the list and review details about the newly selected lesion 18. If the current selected lesion is not a match 20 and there are no additional lesions in the differential diagnosis list 22, the user can decide to revise the descriptor terms 24 and then again selects the descriptor terms to best describe the lesion and indicate when finished 14. In the alternative, if the user does not want to revise the descriptor terms 24, the user can select an option to have the system generate a referral report 26 to refer the patient out of the office and end the diagnosis process 52.

If the user determines that the current selected lesion is a good match with the lesion to be diagnosed 20 then the user finalizes the lesion selection 28. The system then processes the selected lesion and displays the most common medications for treating the selected lesion 30. Referring to FIG. 1B, the user selects one of the medications from the list to review details about the medication 32, such as a description, indications, side effects, and adverse reactions. If the user determines the current selected medication is not the appropriate medication for prescribing to this patient 34 and there are more medications in the list 36, the user can select another medication from the list and review details about the newly selected medication 32. If the user believes the current selected medication is not the appropriate medication 34 and there are not additional medications in the list 36, the user can select an option to have the system generate a referral report 38 to refer the patient out of the office and end the diagnosis process 52.

If the user believes the current selected medication is the appropriate medication for prescribing to this patient 34, then the user finalizes the medication selection and creates a patient prescription 40. At this point in the process, the user can choose one of a variety of options. The user can choose to have the system print the patient prescription 42, generate a medication report 44 describing the medication, generate a patient directions report 46 describing to the patient how to use the medication, or to generate a treatment algorithm 48 that outlines a treatment plan to follow. The user can also choose to have the system save the selected lesion, selected medication, final prescription, and acquired image of the lesion to the patient record. After the user is finished selecting any of these options, the diagnosis process ends 52.

Some advantages to the method of diagnosing oral lesions presented in the present invention include: (1) The process of diagnosing oral lesions is greatly streamlined, such as eliminating the problems associated with: writing down the proper descriptor terms to describe the lesion, flipping through old text books or atlases looking for an image that matches the oral lesion being diagnosed, and determining the proper medication to prescribe to the patient. (2) Reducing the number of patients that are referred out of the office because of uncertainty in a diagnosis and thereby maximizing revenue by treating the majority of oral lesions in-house.

Figure 2:
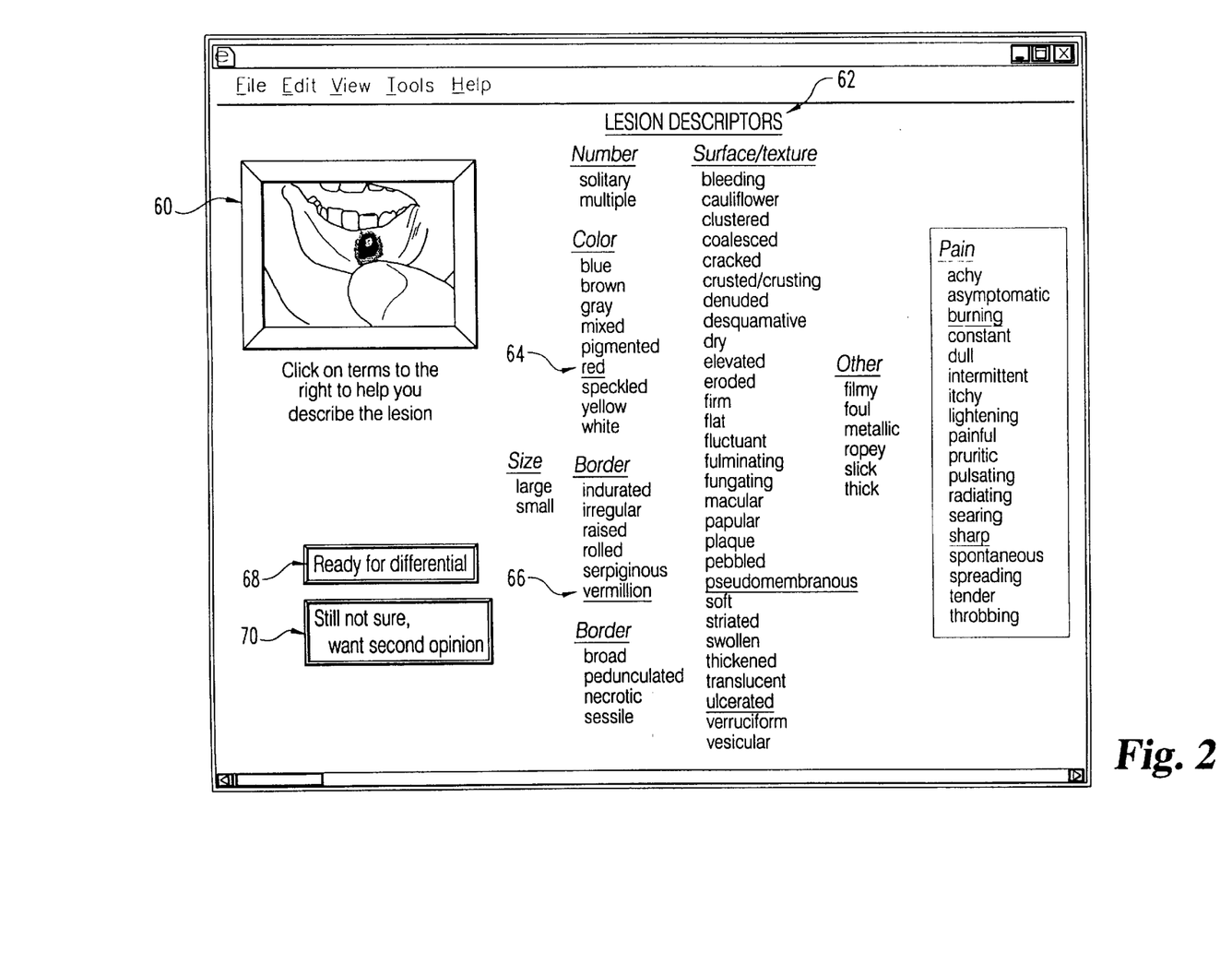
FIG. 2 is a simulated screen of a preferred embodiment showing how the user selects the descriptor terms to describe the acquired lesion and then finalizes the selection.

A preferred embodiment is illustrated in the following examples, with continuing reference to FIGS. 1A–1B. First, as shown in FIG. 2, the user, such as the dentist or dental hygienist, acquires an image of the oral lesion to be diagnosed 60 (step 12). Although the image of the oral lesion to be diagnosed 60 is shown as a black and white sketch for purposes of illustration, it is preferably a color photographic image of the lesion. All illustrations of oral lesions portrayed in the preferred embodiment and described hereafter are preferably color images. The user then selects (e.g. using mouse and cursor) the descriptor terms 62 that best describe the lesion being diagnosed (step 14). These descriptor terms 62 are a unique list of terms associated with various dental lesion records stored in the computer system, with each dental lesion record also including signs, symptoms, and treatment medications. The system visually indicates the descriptor terms that were selected by the user, such as by underlining those that were selected, as shown by way of example in the figure where the words red 64 and vermillion 66 as well as others are underlined to designate they were selected. Those of ordinary skill in the art will recognize that a variety of other appropriate methods could be used to indicate a selection of descriptor terms, and that underlining is just one example. After the user is finished selecting descriptor terms to describe the lesion being diagnosed, the user finalizes the selection (step 14) by selecting the option that he is ready for differential diagnosis 68.

Figure 3:
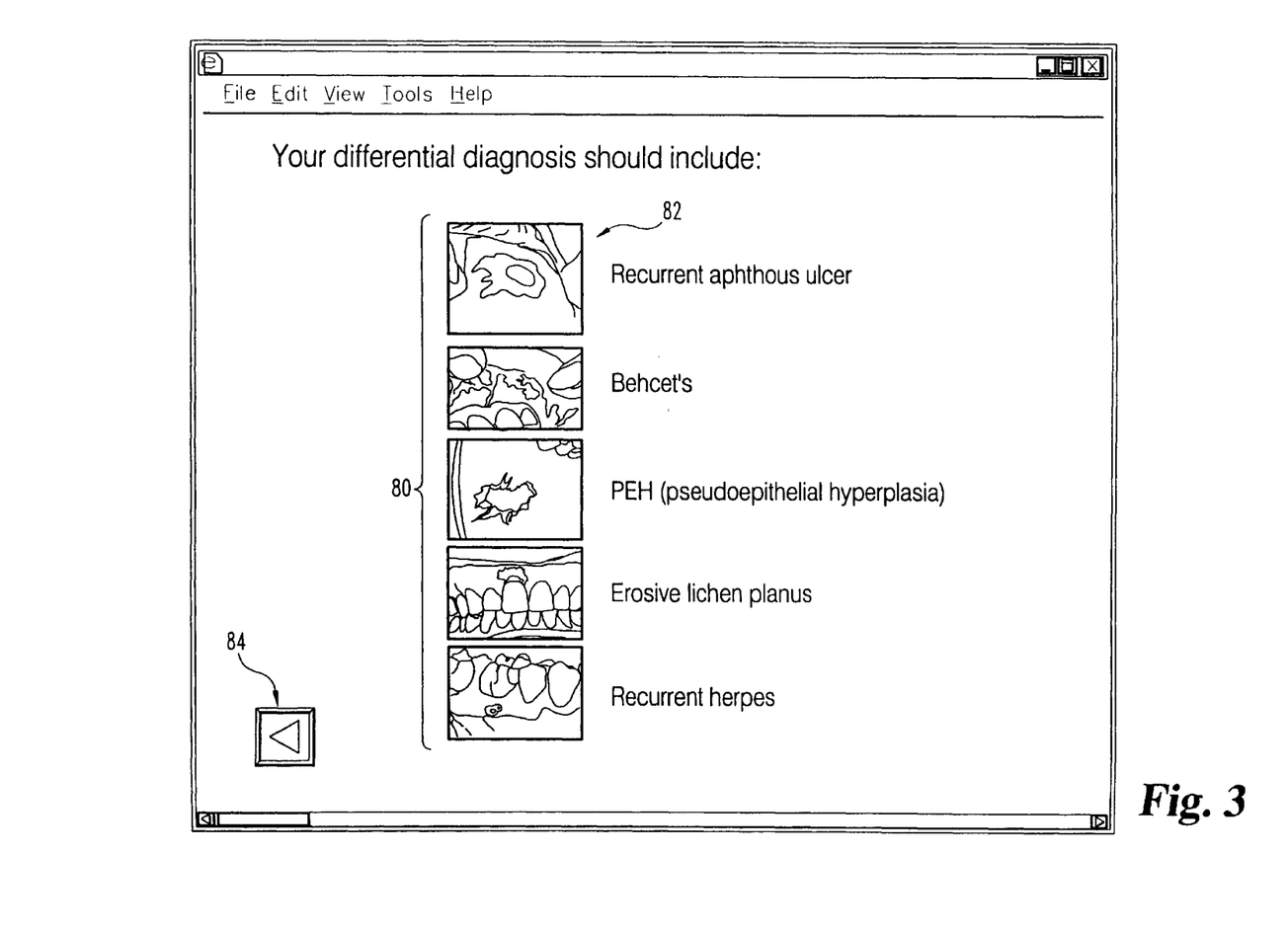
FIG. 3 is a simulated screen of a preferred embodiment showing how the differential diagnosis list is generated based on the descriptor terms selected by the user.
Figure 4:
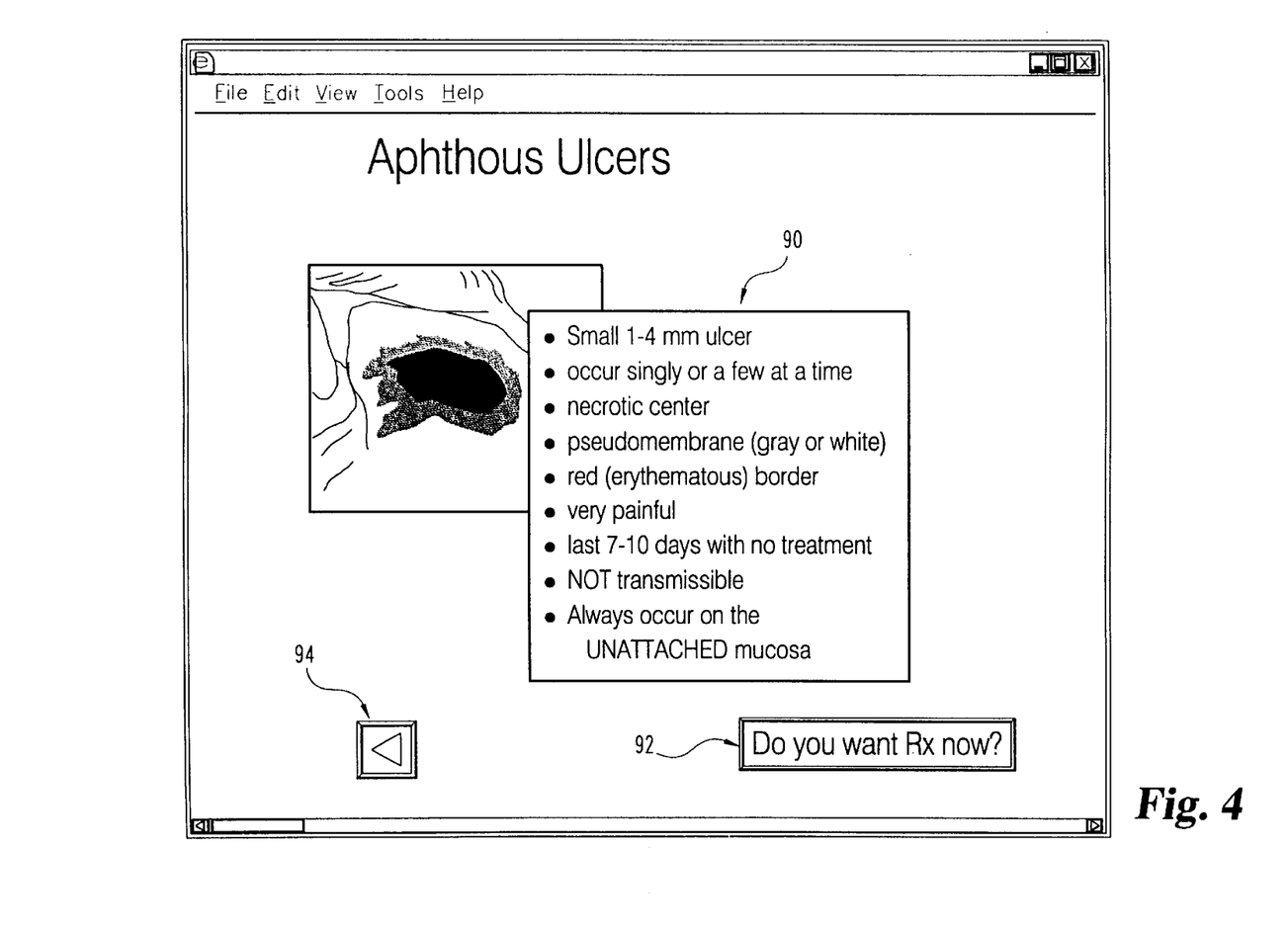
FIG. 4 is a simulated screen of a preferred embodiment showing the type of details about a lesion that can be displayed for a lesion that was selected in the differential diagnosis list.

The computer system processes the user selection to find the oral lesions that most closely match with the descriptor terms chosen by the user (step 16). A screen as shown in FIG. 3 appears next, displaying a differential diagnosis list 80 of the lesions that most closely match the descriptor terms chosen by the user (step 16) and that should be considered as part of the diagnosis. Next, the user selects a lesion from the differential diagnosis list 82, and a screen as shown in FIG. 4 appears to provide the user with details 90 about the selected lesion (step 18), such as signs, symptoms, and behavior. The user next determines whether the selected lesion is a good match with the lesion being diagnosed (step 20).

Figure 6:
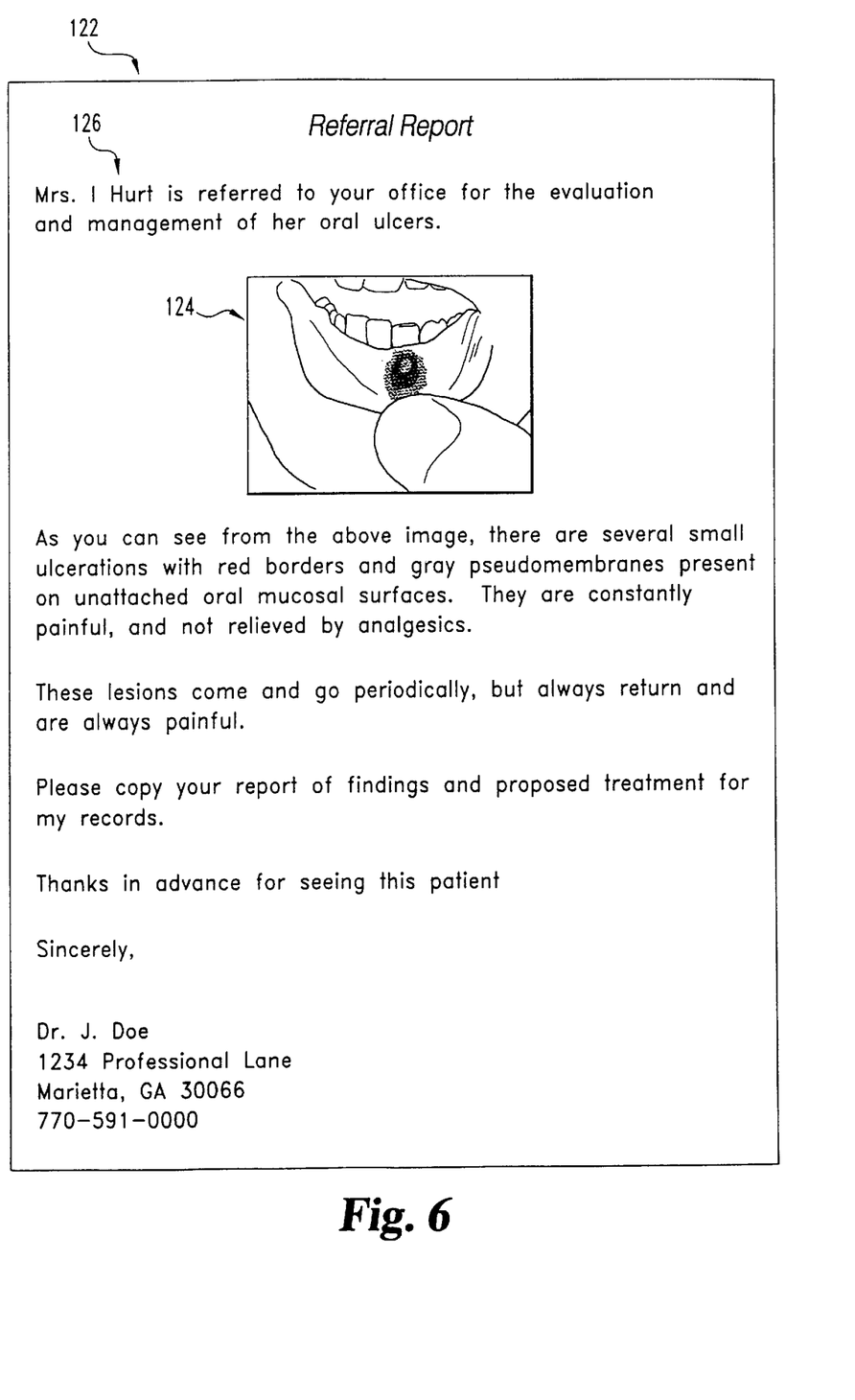
FIG. 6 is a sample referral report of a preferred embodiment.

If the user is not satisfied the current lesion is a good match and wants to review more lesions, the user selects an option 94 to return to the differential diagnosis list (step 22). The screen as shown on FIG. 3 is again displayed and the user can repeat the previous process to select and review additional details about any lesion in the list (step 18). If there are not any additional lesions on the list and the user has not found a good match for the lesion being diagnosed, the user can select an option 84 to return to the main screen for selecting additional descriptors (step 24). The screen shown on FIG. 2 is again displayed and the user can repeat the previous process to revise the descriptor term selections 62 (step 14) and then review the differential diagnosis list 68 generated by the system (step 16). If the user does not want to revise the descriptor terms (step 24) and would like to refer the patient out of the office, the user selects 70 the option to create a referral report (step 26). As shown in FIG. 6, the referral report 122 generated by the system includes, for example, the acquired image of the lesion 124 and an explanation that the patient is being referred elsewhere for proper diagnosis 126.

Figure 5:
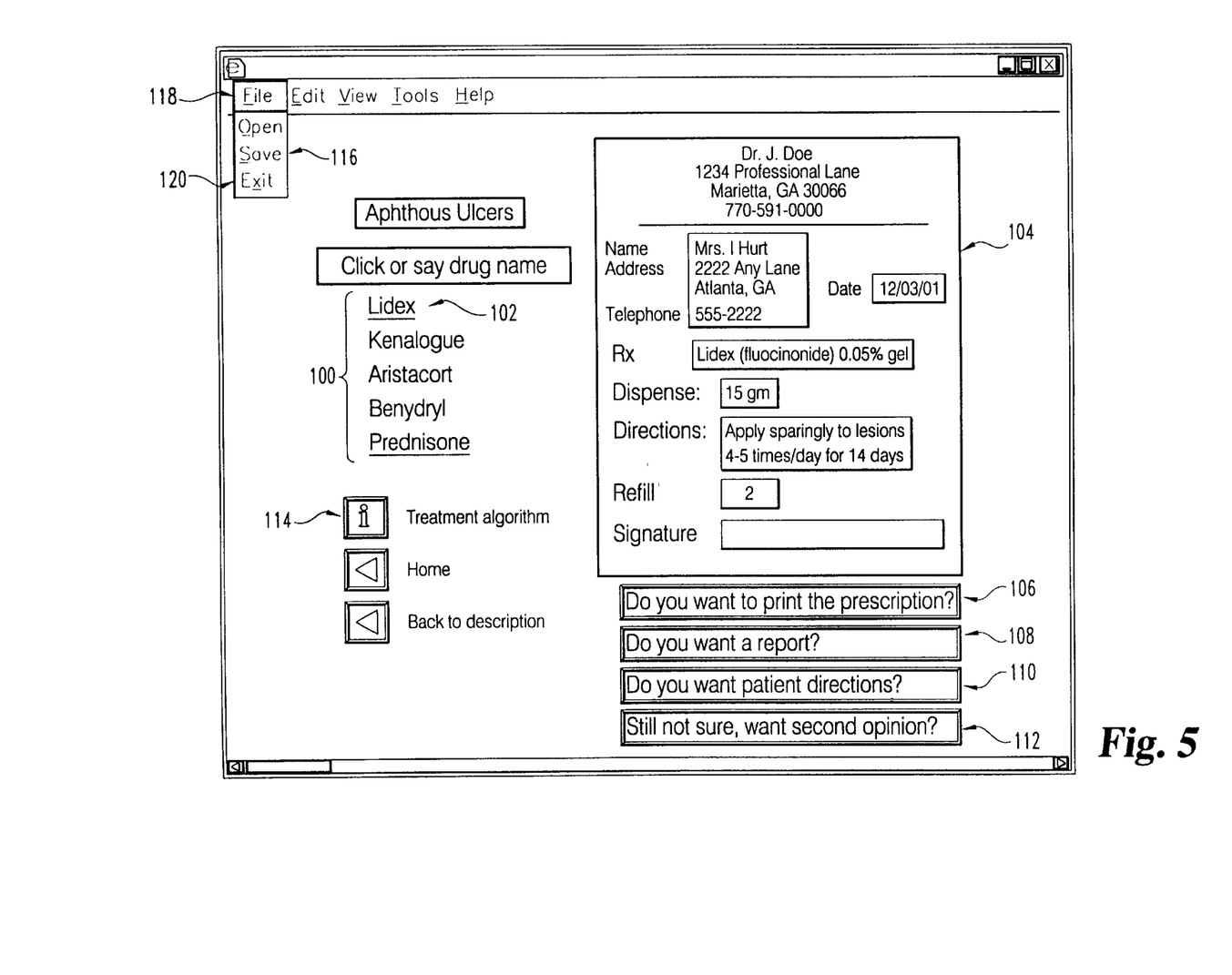
FIG. 5 is a simulated screen of a preferred embodiment showing the recommended medications for treating the lesion and a prescription form for finalizing the prescription.
Figure 7:
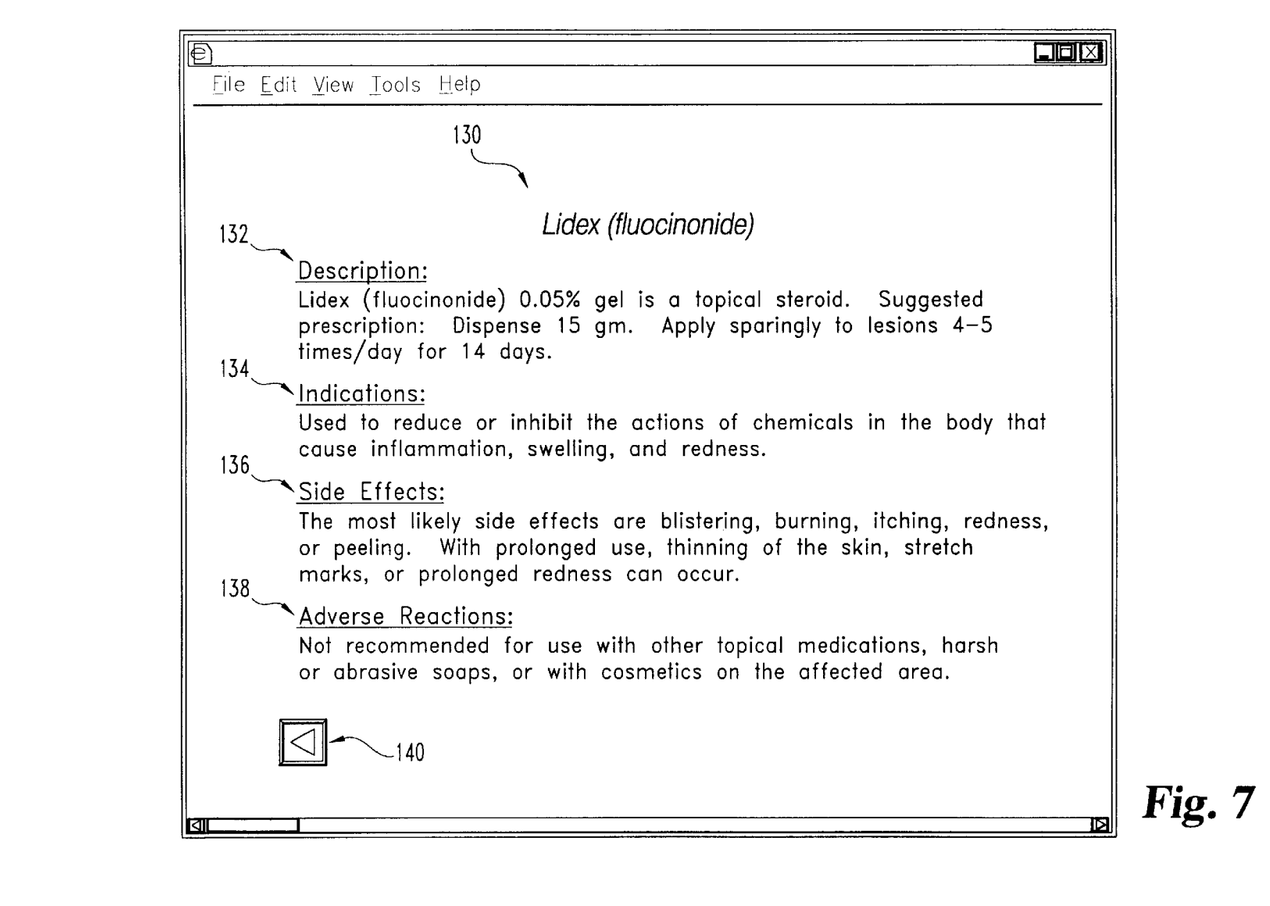
FIG. 7 is a simulated screen of a preferred embodiment showing details about a medication.

Returning now to FIG. 4, if the user is satisfied the current lesion is a good match (step 20) and wants to proceed with generating a patient prescription, the user selects the option to generate a prescription 92 (step 28). A screen as shown in FIG. 5 is then displayed with a list of the most appropriate medications for treating the selected lesion 100 (step 30). The user can select a medication from the list 102. A screen such as FIG. 7 is shown with details 130 about the selected medication, such as a description 132, indications 134, side effects 136, and adverse reactions 138 (step 32). The user can select an option 140 to return to the list of medications. The screen as shown in FIG. 5 is again displayed and the user can optionally continue to select another medication from the list 100 to review the medication details (step 32) until the user is satisfied the best medicine for the patient has been found (step 34). If after reviewing all of the medicines in the list 100 (step 36) the user is unable to find a satisfactory medicine to prescribe to the patient, the user selects 112 the option to generate a referral report (step 38). As shown in FIG. 6, the referral report 122 generated by the system includes, for example, the acquired image of the lesion 124 and an explanation that the patient is being referred elsewhere for proper diagnosis 126. The current diagnosis process then ends (step 52) after generating the referral report. Returning now to FIG. 5, if the user finds a suitable medicine (step 34) and wants to prescribe the medicine to the patient, the user finalizes the prescription (step 40) by filling in the prescription details for the patient 104.

Figure 8A:
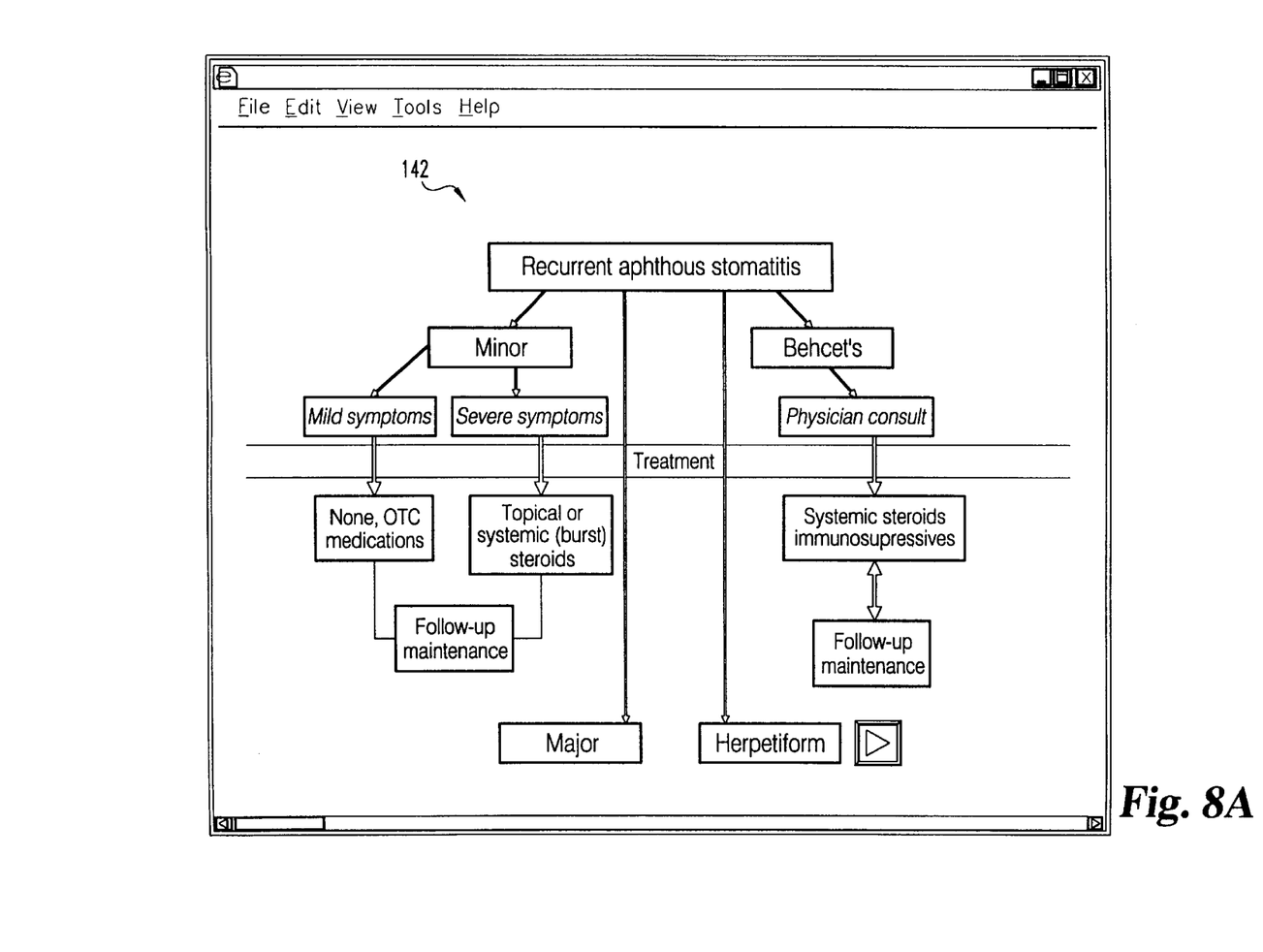
FIG. 8A is simulated screen of a preferred embodiment showing the first half of what a treatment algorithm for a specific diagnosis might include.
Figure 8B:
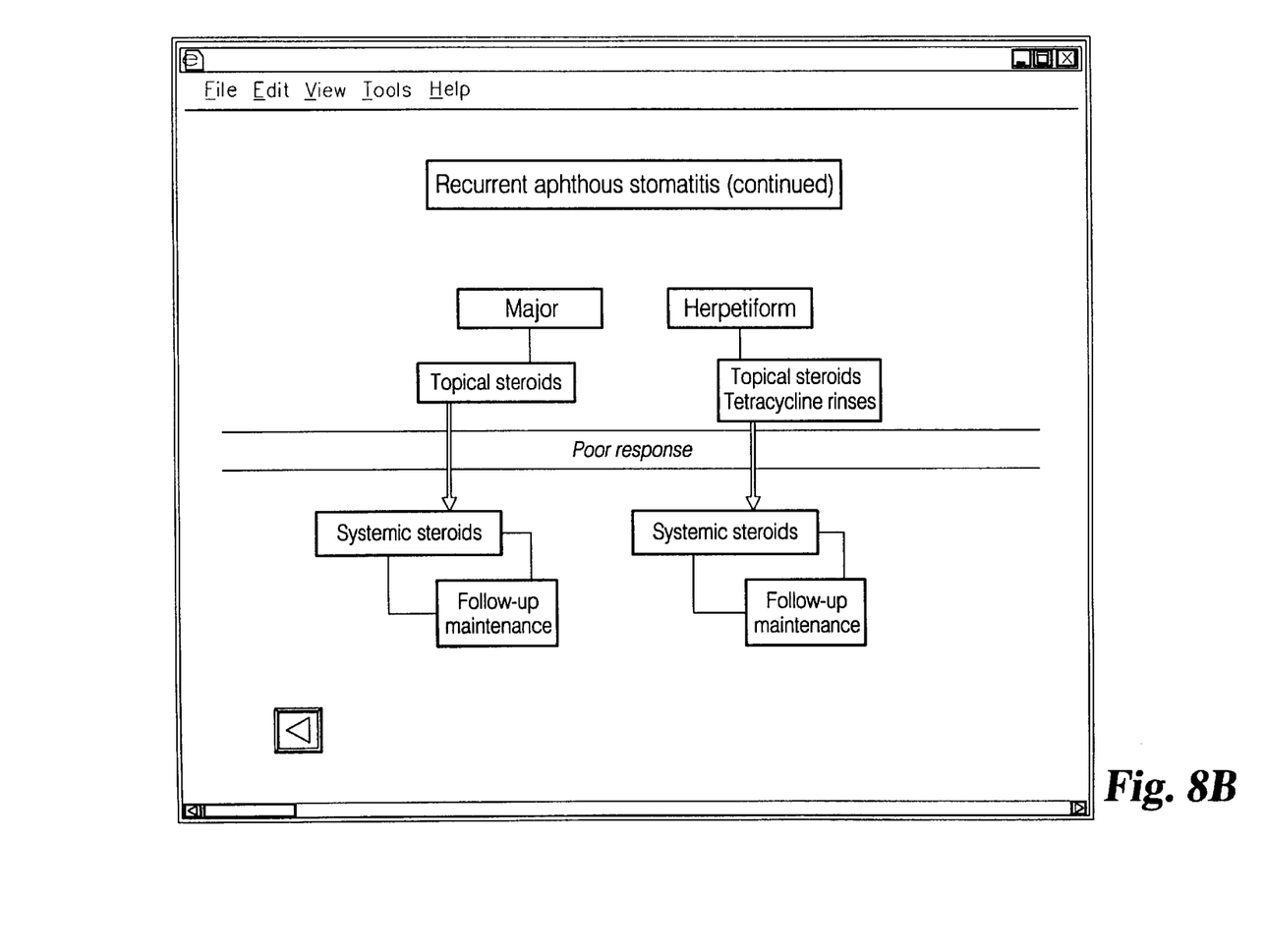
FIG. 8B is a simulated screen of a preferred embodiment showing the second half of what a treatment algorithm for a specific diagnosis might include.

The user has additional options that can be selected. By selecting the option to print the finalized prescription 106 (step 42), the system will print a prescription to an output device that the patient can take to a pharmacy to have filled. By selecting the option to generate a medication report 108 (step 44), the system will print to an output device a report showing the details of the medication, such as a description, indications, side affects, and adverse reactions. By selecting the option to generate a patient directions report 110 (step 46), the system will print to an output device a report that describes how the patient should use the medication. By selecting the option to view a treatment algorithm 114 (step 48), a screen similar to that shown in FIGS. 8A–8B is shown. The user can view a customized treatment plan for managing the patient's condition, which in the example presented is for recurrent aphthous stomatitis 142. Returning now to FIG. 5, the user can select the Save option 116 from the File menu 118 to save the selected lesion, selected medication, the prescription details, and acquired image of the lesion to the patient record (step 50). When the user is finished with diagnosing the oral lesion and selecting the additional options, the user can exit the program by selecting Exit 120 from the File menu 118 thereby ending the process (step 52).

In another preferred embodiment, the software program and method is used to optimize an image for a specific task for dentists and dental hygienists to use as a digital x-ray system or a conventional radiograph rendered digital by transparency scanning.

Figure 9:
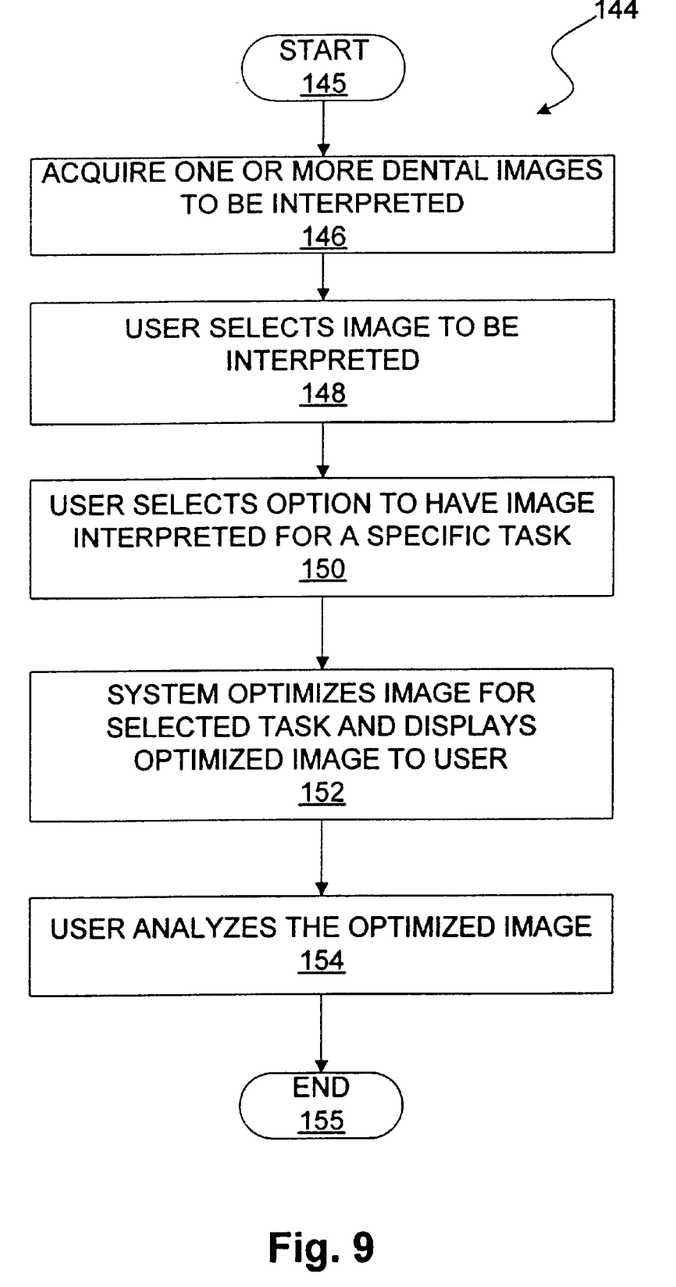
FIG. 9 is a schematic diagram of a preferred embodiment method of interpreting dental conditions, demonstrating the steps and processes involved in optimizing the image for a specific task.

As shown in FIG. 9, the digital x-ray process 144 of the preferred embodiment involves acquiring the digital image or images to be optimized by the system for a selected task. The process starts at 145 and the image or images of the dental condition that needs to be interpreted is acquired 146. The user selects the image to be interpreted 148 and then selects the specific task for which the selected image optimized is to be optimized 150. The computer system executes an algorithm that optimizes the image for the selected task and then displays the optimized image to the user 152. As one non-limiting example, if caries (dental cavity) detection is the selected task, an algorithm optimizes the image to a specific contrast and density that is helpful for detecting caries. As another non-limiting example, if peridontal bone evaluation is the selected task, the image is optimized to a specific contrast and density that is helpful for evaluating peridontal bone conditions. The user can then analyze and interpret the optimized image in further detail 154 and then end the digital x-ray process 155.

Some advantages to the method of optimizing an image for a specific task as presented in the present invention include: (1) The process for interpreting common dental conditions is greatly streamlined, such as eliminating the problems associated with conventional x-rays to analyze and interpret the most common dental conditions (2) saving the dentist time and money by automatically displaying optimized digital images for the selected task.

Figure 10:
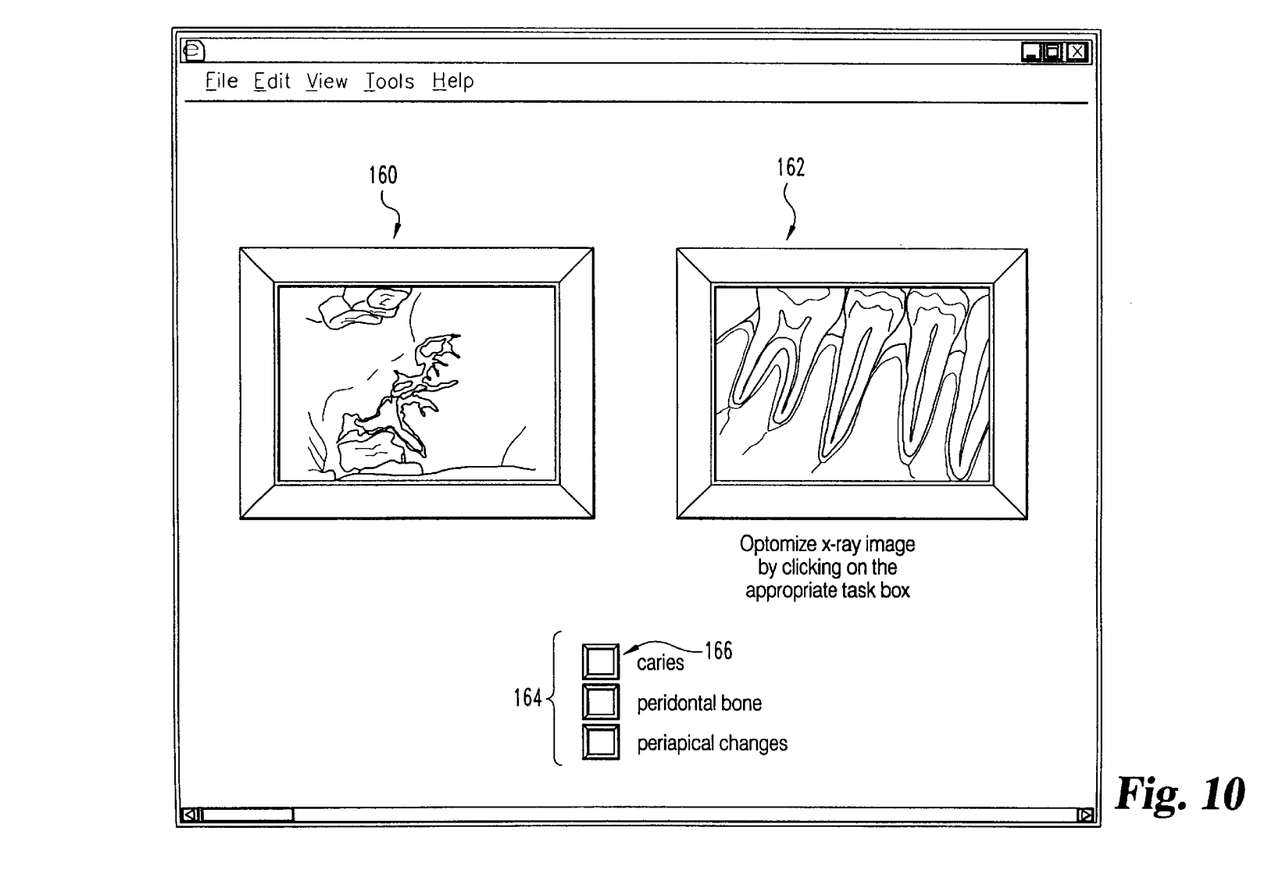
FIG. 10 is a simulated screen of a preferred embodiment showing how the user selects the task for which the acquired image is optimized.

A preferred embodiment is illustrated in the following examples, with continuing reference to FIG. 9. First, as shown in FIG. 10, the user, such as the dentist or dental hygienist, acquires a radiographic digital image 162 of the dental condition to be analyzed (step 146). In some cases, it may be advantageous to display the radiographic information in the window along with a clinical picture, so a second image, the clinical image 160, can also be acquired (step 146). The list of task options 164 for which the image processing algorithm can optimize an image are displayed. The user selects an image to be optimized 162 (step 148) and then chooses one of the task options 166 from the list 164 (step 150). The computer system then uses the image processing algorithm to optimize the image in contrast and density for the selected task (step 152). The optimized image is displayed in the same window 162. The user can analyze and interpret the optimized image (step 154) and then end the interpretation process (step 155).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. A person of ordinary skill in the computer software art is readily capable of practicing this invention based upon this detailed description of the preferred embodiment to date without undue experimentation. A person of ordinary skill in the computer software art will also recognize that the user interface features, including the window navigation style, mechanism for selecting options, screen content and layouts could be organized differently on the same screen or different screens than as portrayed in the illustrations and still be within the spirit of the invention.

What is claimed is:

1. A method for diagnosing oral lesions comprising the steps of:
   (a) acquiring an image of an oral lesion being diagnosed for a patient;
   (b) outputting to a visual display a plurality of descriptor terms for describing a plurality of oral lesions;
   (c) selecting a subset of the plurality of descriptor terms to describe the oral lesion being diagnosed;
   (d) processing the selected subset of the plurality of descriptor terms to output to the visual display a differential diagnosis list of the most probable oral lesions;
   (e) finally selecting a most appropriate oral lesion from the differential diagnosis list;
   (f) processing the finally selected oral lesion to output to the visual display a list of appropriate medications for treating the finally selected oral lesion; and
   (g) finally selecting a most appropriate medication from the list of appropriate medications.

2. The method of claim 1, further comprising the steps of:
   (d1) selecting an oral lesion from the differential diagnosis list to review additional details about the selected oral lesion, wherein said additional details are selected from the group consisting of signs, symptoms, and behavior of the selected oral lesion; and
   (d2) repeating step d1 a plurality of times.

3. The method of claim 1, further comprising the steps of:
   (f1) selecting a medication from the list of appropriate medications to review additional details about the selected medication, wherein said additional details are selected from the group consisting of a description, indications, side effects, and adverse reactions; and
   (f2) repeating step f1 a plurality of times.

4. The method of claim 1, further comprising the step of:
   (h) generating a medication report to describe the finally selected medication.

5. The method of claim 1, further comprising the step of:

(h) generating a patient directions report to describe instructions for how the patient should use the finally selected medication.

6. The method of claim 1, further comprising the step of:

(h) generating a treatment algorithm that describes how to manage the oral lesion being diagnosed.

7. The method of claim 1, further comprising the step of:

(h) storing the finally selected oral lesion and finally selected medication to a record for the patient.

8. The method of claim 1, further comprising the step of:

(h) generating a patient prescription of the finally selected medication.

9. The method of claim 8, further comprising the step of:

(i) storing the patient prescription to a record for the patient.

10. The method of claim 1, wherein:

said step of acquiring an image of the lesion being diagnosed comprises:
capturing an image of the lesion being diagnosed on an image capture device; and
importing the captured image to a computer system in a digital form.

11. The method of claim 10, further comprising the step of:

(h) storing the captured image to a record for the patient.

12. A method for diagnosing oral lesions, comprising the steps of:

(a) storing in a computer system details about each of a plurality of oral lesions, wherein said details are selected from the group consisting of signs, symptoms, treatment medications, and descriptor terms;

(b) acquiring an image of an oral lesion being diagnosed;

(c) retrieving from the computer system a unique list of descriptor terms associated with the plurality of oral lesions;

(d) receiving in the computer system user input operative to select a subset of the unique list of descriptor terms to describe the oral lesion being diagnosed; and (e) using the computer system to compare the selected subset of the unique list of descriptor terms with the descriptor terms stored for each of the plurality of oral lesions to output a differential diagnosis list of the most probable oral lesions.

13. The method of claim 12, further comprising the step of:

(f) receiving in the computer system user input operative to have the computer system output to an output device a referral report, wherein said referral report contains referral details selected from the group consisting of the image of the oral lesion being diagnosed and an explanation that the patient is being referred elsewhere for proper diagnosis.

14. The method of claim 12, further comprising the steps of:

(f) receiving in the computer system user input operative to finally select the most appropriate oral lesion from the differential diagnosis list; and (g) retrieving from the computer system a list of the treatment medications for the finally selected oral lesion.

15. The method of claim 14, further comprising the step of:

(h) receiving in the computer system user input operative to have the computer system output to an output device a referral report, wherein said referral report contains referral details selected from the group consisting of the image of the oral lesion being diagnosed and an explanation that the patient is being referred elsewhere for proper diagnosis.

16. The method of claim 14, further comprising the step of:

(h) receiving in the computer system user input operative to finally select a treatment medication from the list of the treatment medications for the finally selected oral lesion.

17. The method of claim 16, further comprising the steps of:

(e1) receiving in the computer system user input operative to select an oral lesion from the differential diagnosis list and to output details of the selected oral lesion, said lesion details selected from the group consisting of signs, symptoms, and behavior of the selected oral lesion; and (e2) repeating step e1 a plurality of times.

18. The method of claim 16, further comprising the steps of:

(g1) receiving in the computer system user input operative to select a treatment medication from the list of the treatment medications and to output details of the selected treatment medication, said medication details selected from the group consisting of a description, indications, side effects, and adverse reactions; and (g2) repeating step g1 a plurality of times.

19. The method of claim 16, further comprising the step of:

(i) receiving in the computer system user input operative to create a patient prescription for the finally selected treatment medication and to have the computer system output the patient prescription to an output device.

20. The method of claim 16, further comprising the step of:

(i) receiving in the computer system user input operative to have the computer system output to an output device a medication report to describe the finally selected treatment medication.

21. The method of claim 16, further comprising the step of:

(i) receiving in the computer system user input operative to have the computer system output to an output device a patient directions report to describe instructions for how to use the finally selected medication.

22. The method of claim 16, further comprising the step of:

(i) receiving in the computer system user input operative to have the computer system generate a treatment algorithm that describes how to manage the oral lesion being diagnosed.

23. The method of claim 16, further comprising the step of:

(i) storing in the computer system the finally selected lesion and the finally selected treatment medication in a record associated with a patient.

24. A method for interpreting dental conditions, comprising the steps of:

(a) acquiring to a computer system a digital image of a dental condition to be interpreted;

(b) selecting a task option to have the image interpreted for a specific task;

(c) optimizing the image for the selected task option; and (d) displaying the optimized image.

25. A method for interpreting dental conditions, comprising the steps of:
- (a) storing in a computer system an algorithm for optimizing digital images for a plurality of dental tasks;
- (b) acquiring to the computer system a digital image of a dental condition to be interpreted;
- (c) outputting a list of the plurality of dental tasks;
- (d) receiving in the computer system user input operative to select a dental task from the list;
- (e) using the algorithm stored in the computer system to optimize the acquired digital image for the selected dental task; and
- (f) outputting the optimized image.

* * * * *